United States Patent [19]

Miura

[11] 4,370,115

[45] Jan. 25, 1983

[54] INJECTION MOLDING METHOD AND DEVICE

[76] Inventor: Takashi Miura, 1-14-19 Honcho, Asaka-shi, Saitamaken 351, Japan

[21] Appl. No.: 173,038

[22] Filed: Jul. 28, 1980

[51] Int. Cl.³ .......................... B29F 1/08; B29G 3/00
[52] U.S. Cl. .................................. 425/144; 425/543; 425/549
[58] Field of Search ................. 425/549, 144, 543

[56] References Cited

U.S. PATENT DOCUMENTS

| 2,296,295 | 9/1942 | Shaw | 425/549 X |
| 2,658,237 | 11/1953 | Cuppett | 425/549 X |
| 3,797,984 | 3/1974 | Yago | 425/549 X |

*Primary Examiner*—Thomas P. Pavelko
*Attorney, Agent, or Firm*—Kane, Dalsimer, Kane, Sullivan and Kurucz

[57] ABSTRACT

Raw material of less than 10% of the one injection amount is heated at a time to a high temperature just before injected into the mold cavity by an intermittent heater and is injected continuously into the cavity keeping that temperature. Heat capacity of the heater is small to obtain quick response and to give no heat effect to the raw material to be injected for the next product. The device of this invention comprises a device to inject a predetermined amount of raw material for one injection intermittently, a flow path for the raw material which connects said device and the mold, and electric resistant heater in the flow path to generate Joule heat and to transfer the generated heat to the raw material flowing through said flow path.

7 Claims, 4 Drawing Figures

INJECTION MOLDING METHOD AND DEVICE

BACKGROUND OF THE INVENTION

1. Field of the Invention

The invention described herein relates to injection or transfer molding method and device in which raw material of rubber, rubber like substances or synthetic resins is injected into a mold to obtain hardened or cured products by vulcanization or intermolecular cross linkage reaction.

2. Description of the Prior Art

This invention aims at providing a method and a device to shorten the period required for vulcanization or hardening. The following description will be limited to rubber, although this invention is applicable to other materials such as rubber like substances and synthetic resins.

The ultimate object of the injection molding of rubber is considered to be, "to vulcanize the raw material as soon as it is injected into the mold cavity." Methods employed hitherto, however, are far from the above objective, although much effort has been devoted toward achieving this object. For example, conventional vulcanization takes at least 2 minutes after raw material is injected into the mold cavity. Usually a 4 to 10 minutes period is required for vulcanization in the mold cavity at about 150° C. a conventional molding temperature.

Before coming into the details of the prior art, thermal characteristics of rubber will be described below. After adding necessary elements such as vulcanizing agent and after mastication, the vulcanization process of raw rubber depends on the heat history in which temperature and time are parameters. Rate of vulcanization is quite sensitive to its temperature. For example, temperature increase of 10° C. decreases the vulcanization period to about a half.

From this character of raw rubber, it can be said theoretically that vulcanization finishes within 15 seconds when the raw material temperature in the mold cavity is, for example, 180° C. Usually, raw rubber is treated in a low temperature for example between 75° C. and 120° C. before injection in order to avoid scorching. Once rubber is scorched, it loses its flowability irreversibly. Therefore, in the conventional method, temperature of the raw rubber is kept low enough before injection and is heated to a vulcanization temperature after injected into the mold cavity. That is, in the conventional method, both heat-up time and vulcanization time are required in the mold cavity. This is one of the reasons why the vulcanization period can not be shortened in the conventional method.

There have been some efforts to raise the temperature of the raw rubber just before injected into the mold cavity in order to save the heat-up time in the mold cavity. However, the heating method in the conventional injection or transfer molding is adding heat to the raw material through structures during the process before injection, such as in the process of compressing, heading, heat softening, transfer, etc. That is, the heaters are located outside of thick structures or flow paths of heat medium are located in the thick structures.

As heat is transfered through thick structures in the conventional method, temperature response of raw material to the heater is very slow. This made it very difficult to raise the temperature of raw material sharply just before it is injected into the mold.

In the injection molding process, a predetermined mass of raw material is transfered intermittently. Heat capacity of the structures and mass of raw material which is heated at a time are large in the conventional method. This makes the time necessary to achieve the thermal equilibrium between the raw material and the heating device long. This is one of the disadvantages of the conventional method. That is, degree of vulcanization of material which is heated at an early stage of injection is different from that of material heated at a later stage as they have different heat history. This creates nonuniformity of the products.

Rubber is rather a heat insulator than a good heat conductor. The heat conductance of rubber, for example, is 1/500 of steel, 1/5 of water and 6 times that of air. The heat capacity of rubber is more than 4 times that of steel, although it depends on the compounding ratio of the rubber. From this character of the rubber, another disadvantage of the conventional method arises. That is, raw material is heated from surroundings after injected into the mold in the conventional method and this requires the time for heat to be transferred to the inside of the products. And the difference in heat history between surface and core makes the product nonuniform. Nonuniformity of vulcanization is a serious problem especially in cases where the product is thick or has uneven thicknesses.

SUMMARY OF THE INVENTION

Briefly stated, the above disadvantages are eliminated in the present invention by providing a method and a device to heat raw material of less than 10% of the one injection amount at a time to a high temperature just before injection while it is flowing into the mold cavity and to inject it continuously into the cavity keeping that temperature.

An object of the invention therefore is to shorten the period required for the vulcanization to, for example, 10 to 15 seconds. Raw material is heated to a high temperature which is almost the same as that of the mold (170°–180° C.) just before injected into the mold cavity in the present invention. Therefore, it is not necessary to wait for the raw material to be heated in the mold.

Another object of the invention is to raise the temperature of the raw material sharply just before injected into the mold. For this purpose, heater of small heat capacity is used and the heater contacts the raw material directly. And forced convection heat transfer is utilized for heat transfer from heater to the raw material.

Still another object of the invention is to heat the raw material uniformly. This object is achieved by using the heater of small heat capacity as mentioned above and the amount of raw material to be heated at a time being only a part of the amount for one injection. Small heat capacity and small amount of raw material to be heated at a time make the temperature of the raw material and that of the heater come to thermal equilibrium condition in a short period. In this invention, the amount of raw material to be heated at a time is preferably kept less than 10% of the amount of one injection. The raw material is heated while it passes through the heating flow path. Heat generation in the heater and the heat removed by the flow of the raw material become practically the same in a short period to achieve thermal equilibrium. This means practically all the raw material for one injection is heated uniformly before injected to the mold cavity.

Yet another object of the invention is to provide the method and device to produce uniformly vulcanized products despite the shape of the products and the thickness of the wall of the products. This object is achieved by heating the raw material uniformly before injection as mentioned above.

DESCRIPTION OF THE PREFERRED EMBODIMENT

Figure 1:
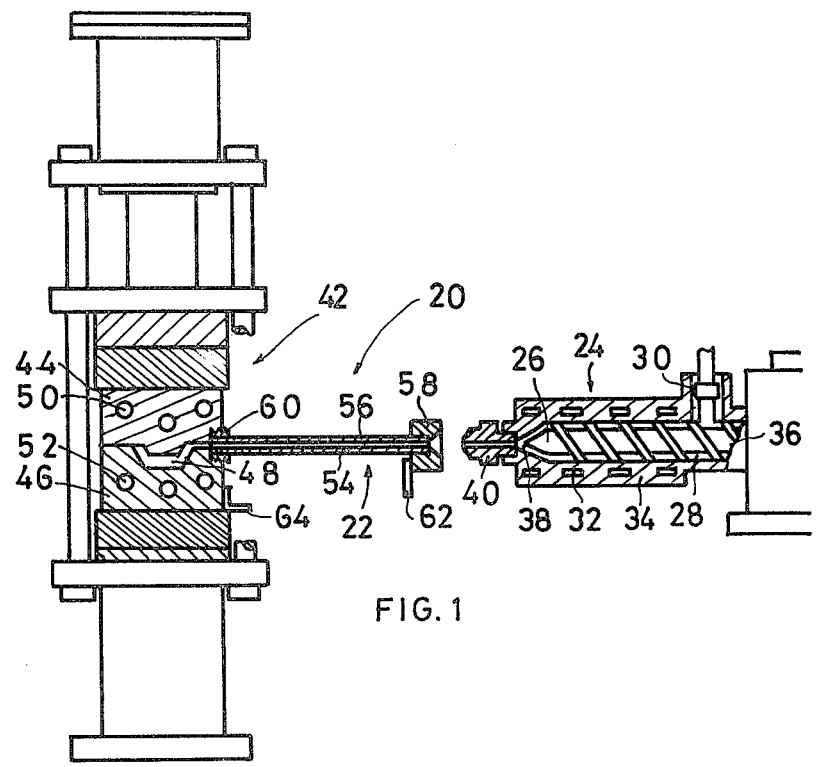
FIG. 1 is the partly sectional view showing the part of the injection molding device having intermittent heater of the present invention.

Reference is now made to the drawings wherein similar components bear the same reference numeral throughout the several figures.

FIG. 1 shows the essential part of the preferred embodiment of the injection molding device 20 of this invention having intermittent heater 22. Plasticizing cylinder 24 has a cylindrical shape and contains a rotating screw 26 to knead and transfer raw material 28. Raw material 28 is supplied through hopper 30 to the plasticizing cylinder 24. Flow path 32 for the heat medium is drilled through the barrel 34 of the plasticizing cylinder 24. Heat medium of a predetermined temperature flows through the flow path 32 to control the temperature of the raw material 28 stored in the plasticizing cylinder 24. An end 36 of the rotating screw 26 is connected to the piston (not shown) which works by fluid pressure so that the rotating screw 26 can move back and forth within the plasticizing cylinder 24. Raw material is stored initially in the space 38 in front of the rotating screw 26. Then according to the motion of the piston which responds to the instruction, one injection amount of raw material is pushed from the space 38 through the nozzle 40 to the mold cavity 48.

Mold 42 consists of a movable part 44 and fixed part 46. Molding cavity 48 is formed when the movable part 44 of the mold 42 is clamped to the fixed part 46. Flow paths 50 and 52 for heat medium are drilled through the mold 42. Heat medium at a predetermined temperature is forced to flow through the flow paths 50 and 52 to keep the mold 42 at a predetermined temperature for vulcanization.

Figure 2:
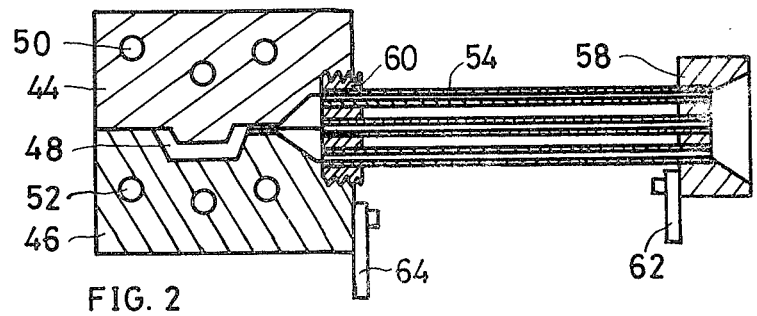
FIG. 2 is the sectional view of the intermittent heater of the another embodiment of the present invention.

In this invention, intermittent heating device 54 consists flow path 56 which connects the nozzle 40 and the mold 42. As shown in FIG. 2 in detail, the flow path 52 is made of a single or several pipes made of any material which has practically the same characteristics as the electric resistant heater such as stainless steel or carbon steel. The flow path 56 has bush 58 on an end and has connecting end 60 on the other end. Raw material which is pushed out from the nozzle 40 flows through the flow path 56 to the mold cavity 48. Electrodes 62 and 64 are mounted at locations which connect electrically the both ends of the flow path 56. From the variable electric source which is not shown in the figure, electricity is supplied to the electrodes 62 and 64. Electricity is supplied intermittently in order to produce Joule heat corresponding to the flow of the raw material. That is, Joule heat is generated when the raw material is flowing in the flow path 56 to raise the temperature of the raw material just before it is injected into the mold cavity 48.

The structure of the flow path 56 may be as follows: Pipings of small radii are located in a piping of larger radius and flow path may be between and/or inside the small pipings.

Heat capacity of the intermittent heating device 54 should be small in order to obtain quick response in heating. Heat transfer efficiency of the intermittent heating device 54 should be large in order to raise the temperature of the raw material rapidly. So, the flow path 56 should preferably consist of numerous number of thin walled pipings.

The raw material which flows out from the nozzle 40 is heated by the Joule heat to a high temperature so that the material vulcanizes in a short period. And it is injected into the mold cavity 48 keeping that temperature. Electricity is supplied to the intermittent heating device 54 only when the raw material is flowing. When one injection amount of raw material passes the flow path 56, that is, the mold cavity 48 is filled with the raw material, the electricity to the intermittent heating device 54 is cut off. The temperature of the raw material is raised to a predetermined temperature by supplying electricity to the intermittent heating device 54 in accordance with the flow of the raw material.

The electricity which is supplied to the intermittent heating device 54 is usually low voltage and high current, for example, less than 10 v and between 300 and 3000 A. The electricity which is supplied to the intermittent heating device 54 is large enough to raise it to a very high temperature when it is placed in the air. However, when the raw material is flowing, it takes the heat away from the heater, causing the temperature of the heater to be kept constant and the raw material temperature at a predetermined vulcanization temperature without becoming too high. Thus the raw material is heated to a predetermined vulcanization temperature rapidly without heated too much.

It is possible, if necessary, to remove the unnecessary part of the heated raw material by providing the cold slug well which is not shown in the figures.

In order to make the amount of the unnecessary part of the heated raw material less and in order to make the temperature of the heated raw material even, the volume of the flow path 56 should be less than the one injection amount and preferably less than 10% of one injection amount.

As a preferred embodiment, the intermittent heater 54 is made of stainless steel tubes without a seam, having a inner diameter of 1.5 mm and an outer diameter of 2.0 mm. Raw material is injected at a pressure of 2500 kg/cm$^2$. With the above mentioned embodiment, injection molding is performed successfully. That is, all the raw material flows into the mold cavity without scorching or sticking to the inner surface of the tubes. No material became scorched and all the material was heated to a predetermined temperature before injected into the mold cavity.

The above mentioned structure of the intermittent heater does not need any other reinforcement. In other words, the heater is made of thin tubes only. This makes the heat capacity of the heater very small. Small heat capacity of the heater makes it possible to change the temperature of the heater quickly and accurately according to the amount of electricity supplied corresponding to the flow of the raw material. Cutting off the electricity when the flow of the raw material stops cools the heater rapidly.

The quick and accurate response of the heater is important to raise the temperature of raw material which is injected at a time and not to give any thermal effect to the succeeding raw material which is to be used for the next product.

When the mold cavity is full of heated raw material, the raw material in the heating pipe does not flow any more. In order to keep the raw material in the heating pipe unscorched, the electricity added to the heating pipe is cut off just before, for example one second before the raw material stops to flow. This can be done because the heat capacity of the heater and raw material in the pipe is small in this invention.

Unscorched raw material in the pipe is used in the next injection process. For the next injection, electricity is added to the heating pipe just before, for example one second before the raw material starts to flow in order to heat the raw material kept in the pipe to the predetermined temperature.

Thus, almost all the raw material is utilized for injection without scorching losses.

In case that the pipe is not strong enough to withstand the injection pressure, it is possible to reinforce the pipe from the outside of insulator which covers pipe.

Because the pipe is used as heater, scorched raw material can be ejected by injection pressure in case that malfunction makes the raw material scorched in the pipes. Also, rods having a diameter practically the same as the inner diameter of the pipes can be used to eject the scorched or stuck raw material out of the pipes.

Figure 3:
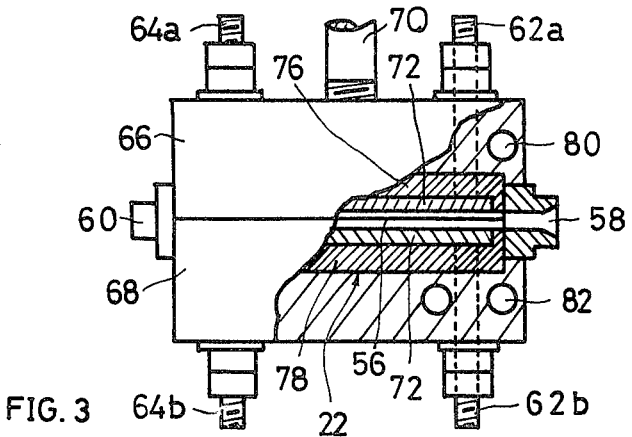
FIG. 3 is the partly sectional view of the still another preferred embodiment of the intermittent heater of the present invention.

FIG. 3 shows partially cutaway view of another preferred embodiment of this invention.

In this embodiment, intermittent heater 22 is divided into the upper part 66 and the lower part 68. When the upper part 66 and the lower part 68 are clamped together, flow path 56 is formed between them which will not leak hot raw material. When the parts 66 and 68 are divided, inner surface of the flow path 56 is exposed to the air. The upper part 66 is fixed to the movable part 44 of the mold 42 not shown in FIG. 3 with a screw 70 in order to open and close with the mold. Bush 58 is located at one end of the flow path 56 and connecting rod 60 at the other end. Thus, the nozzle 40, bush 58, connecting rod 60 and the inlet of the mold cavity 48 can be connected tightly to form a flow path for the raw material. The nozzle 40, the bush 58, the connecting rod 60 and the inlet of the mold cavity 48 may be detached when the mold 42 is opened.

Electric resistant heaters 72 and 74 are located in the flow path 56. Heaters 72 and 74 are covered with insulators 76 and 78. Heaters 72 and 74 must be thin enough, for example less than 0.1 mm to keep their heat capacity small. Electrodes 62a, 62b, 64a and 64b are connected to the both ends of each heater 72 and 74 respectively. The electrodes 62a, 62b, 64a and 64b go through and are fixed to the upper part 66 and the lower part 68 respectively and are insulated. Thus, electricity can be supplied from the outside.

Electricity is supplied intermittently according to the flow of the raw material. That is, electricity is supplied only when the raw material flows in the flow path 56.

The gap between heaters 70 and 72 constitutes the flow path 56. In order to heat the raw material efficiently, the gap must be small, for example about 1 mm. Volume of the gap should be less than one injection amount of the raw material and preferably less than 10%.

Flow path 80 and 82 for the heat medium are drilled through the upper part 66 and the lower part 68 of the intermittent heater 22 respectively. Temperature of the heat medium at one end of the intermittent heater 22 is kept practically the same as that of the raw material at the nozzle 40, for example 90° C. Temperature of the heat medium at the other end of the intermittent heater 22 is kept practically the same as that of the mold 42, for example 180° C. Thus, the temperature gradient is given to the intermittent heater 22 along the direction of the flow of the raw material.

The insulators 76 and 78 are made of heat resisting electric insulating coating such as polyamide-imide varnish, alkyd polyester varnish, silicone varnish etc. Ceramic coating, enamel or glass lining can be used as the insulators 76 and 78. Also, molded silicone compounds can be used.

The electric resistant heaters 72 and 74 are thin plates of nickel-chrome alloy, iron-chrome-aluminum alloy or other electric resisting alloy. Alloys which are not used as the intermittent heater usually such as stainless steel can be used as the electric resistant heaters 72 and 74.

The configuration of the electric resistant heaters 72 and 74 are not restricted to thin plates. Wires or pipes can be used as the heater 72 and 74, provided that the heaters 72 and 74 are located in the flow path 56 and contact the flowing raw material directly.

The surface of the electric resistant heaters 72 and 74 may be coated with fluororesin, silicone resin, polyamide or ceramic. In this case, heat is transferred from the heaters 72 and 74 to the flowing raw material through the thin coating.

With coating, it is convenient to remove the unnecessary raw material from the heating flow path 56 when the inner surface of the flow path 56 is exposed to the air. Thus, configuration of the flow path 56 may be complex.

Figure 4:
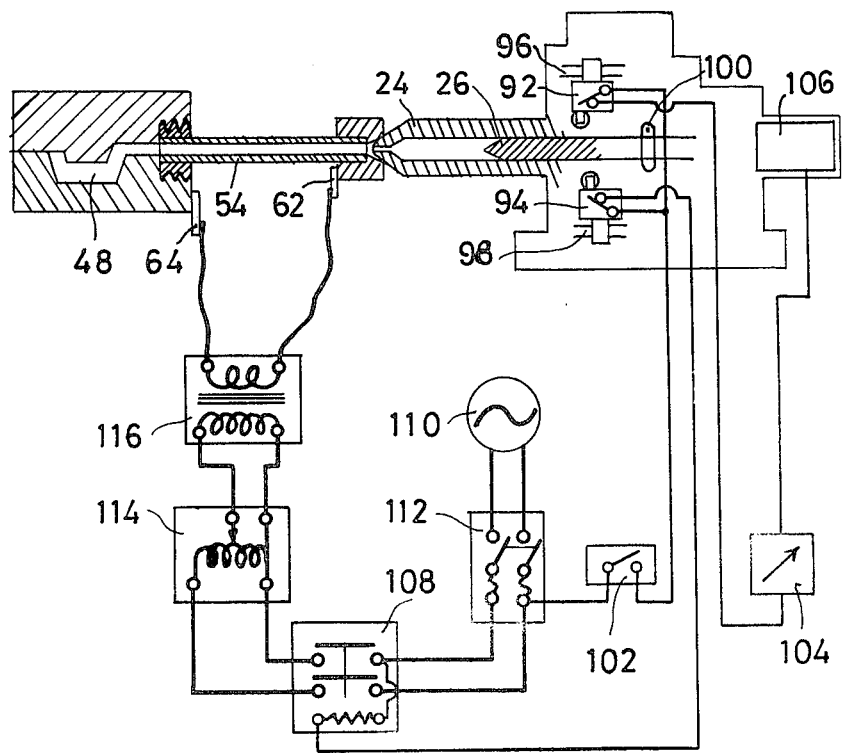
FIG. 4 is a systematic diagram of the intermittent heater and the injection instructing device of the present invention.

FIG. 4 shows the preferred embodiment and the block diagram of the instruction device for the heating and ejection of this invention.

Limit switches 92 and 94 are slidably mounted on bars 96 and 98 respectively. A projection 100 is protruding from the rotating screw 26 to operate the limit switches 92 and 94 when the rotating screw 26 moves back and forth.

The location of the limit switch 92 is adjusted by sliding it on the bar 96 so as to operate when the rotating screw 26 reaches the left hand end. The location of the limit switch 94 is adjusted to operate just before when the rotating screw 26 reaches to the left end. That is the limit switch 94 is adjusted to operate when the rotating screw 26 reaches, for example 2 mm to the right of the left end.

In order to operate the device, snap switch 102 is pushed on. Then the electric current goes through the limit switch 92 to the time relay 104. The time relay 104 transfers the instruction by delaying it a predetermined period, for example 0.5 second to the ejection mechanism 106. That is, the rotating screw 26 starts to move when the predetermined period has passed after the snap switch 102 is on.

Also electric current goes through the limit switch 94 to the coil of the magnet switch 108 to close it. When the magnet switch 108 closes, electricity from the power source 110 goes through the main switch 112 to a slide transformer 114. The electric current is changed by the slide transformer 114 and the second transformer 116 to a predetermined voltage, for example less than 10 v.

Then the electricity is supplied to the intermittent heater 54. That is, the intermittent heater 54 starts to generate heat as soon as the snap switch 102 is on and the flow of raw material starts 0.5 second later as mentioned above.

The flow of the raw material continues until all of the one injection amount passes through the intermittent heater 54. During most of this period, the electricity is supplied to the intermittent heater 54 to heat the raw material in the flow path 56. The raw material is heated to the vulcanization temperature during its passes through the flow path 56 and injected into the mold cavity 48 keeping that temperature.

When the rotating screw 26 comes to a little before, for example 2 mm before the left hand end, the limit switch 94 is operated by the projection 100 to cut the electricity to the intermittent heater 54. After the electricity to the heater 54 is cut off, the rotating screw 26 continues to go left to eject the raw material into the mold cavity 48. When the rotating screw 26 comes to the left hand end, the limit switch 92 is operated by the projection 100 to stop the motion of the ejection mechanism 106.

It is possible to change the amount of the raw material to be ejected by adjusting the location of the limit switch 92. It is also possible to make the amount of raw material to be injected after the electricity is cut off to the heater 54 by changing the location of the limit switch 94.

Delay time is changed according to the properties and amount of the raw material by adjusting the time relay 104.

Thus the timing and the period that the electricity is supplied to the intermittent heater 54 is adjusted to control the temperature of the raw material which remains in the heater 54 after a injection process. That is, the temperature of remaining material must be kept low enough not to be vulcanized before next injection. The remaining raw material must be heated in a short while to the vulcanization temperature before next injection starts.

On the other hand, electricity may be supplied to the intermittent heater 54 also while the flow of the raw material stops. This permits the raw material stagnant in the intermittent heater 54 to be eliminated easily. Although the electric circuit may be different in this case from that shown in FIG. 4, it will easily be practiced from the knowledge shown in FIG. 4.

A small amount of electricity may be supplied to the heater 54 while the flow of the raw material stops in order to keep the temperature at a predetermined value below vulcanization temperature.

Moreover, the electricity supplied to the heater 54 while the raw material flows may be varied in order to change the temperature of the raw material. Thus, the one injection amount of raw material which has temperature gradient in itself is injected to the mold cavity 48. This method makes a product having different material properties between the surface and the core.

The method and the device of this invention are not restricted to rubber but also applicable to the rubber like substances, thermoplastics having cross linkage reaction, and foaming injection process.

With the method and the device of this invention, the vulcanization period in the mold cavity can be shortened easily to, for example 10 seconds. The process is stable and repeatable. Thus, the formation process cycle can be shortened.

With the method and the device of this invention, the products are uniformly vulcanized regardless of the thickness and the sizes.

What is claimed is:

1. An injection molding device for thermosetting molding materials, which comprises:
   an injection means, an intermittent heater, and a mold cavity;
   the intermittent heater having a small heat capacity and defining a passage for transmitting molding material from the injection means to the molding cavity;
   the passage having a volume less than the volume of the mold cavity and being adapted to being rapidly heated when electricity is supplied to the intermittent heater and rapid cooling when the electricity is interrupted or reduced; and
   the intermittent heater and injection means acting in cooperation with the mold cavity so that molding material is uniformally heated to approximately the same temperature as the molding cavity as it flows through the passage during injection and the molding material remaining in the passage between injections is cooled to avoid adverse heat effects.

2. An injection molding device for rubber, rubber like substances, synthetic resins with vulcanization, cross linkage, foaming reactions, and the like, comprising:
   a means for maintaining raw material at a temperature which is low enough not to scorch it and adapted to ejecting a predetermined injection amount of said raw material intermittently therefrom through a nozzle in response pressure;
   a heating flow path defined by an electric resistance heater having narrow cross sectional area connecting said nozzle and a mold in order to introduce heated raw material to the mold cavity;
   the electric heater that defines the flow path being constructed of material that produces heat when an electric current passes therethrough and having small heat capacity and large heat transfer area so that the temperature of raw material therein may be rapidly increased to its reaction temperature or decreased;
   a control circuit that supplies electricity to said electric resistance heater while the raw material is flowing therethrough and when the raw material stops flowing reduces or stops electricity to said heater; and
   a mold cavity which is kept at approximately the same temperature as that of the raw material ejected from the flow path.

3. An injection molding device as described in claim 2 wherein the heating flow path is defined by multiplicity of thin plates of electric resistant heater material forming at least one slit.

4. An injection molding device as described in claim 3 wherein the volume of the heating flow path is less than 10 percent of one injection amount.

5. An injection molding device as described in claim 2 having a plurality of heating flow paths each defined by an annular electric resistance heater.

6. An injection molding device as described in claim 5 wherein the annular electric resistant heater is of small diameter and of thin wall which can withstand injection pressures.

7. An injection molding device as described in claim 6 wherein the inner diameter of the annular electric resistant heater is less than 1.5 mm and the outer diameter is less than 2.0 mm.

* * * * *